United States Patent [19]

Patrick

[11] Patent Number: 5,312,601
[45] Date of Patent: * May 17, 1994

[54] POND FERTILIZING APPARATUS

[76] Inventor: Joseph H. Patrick, 507 Creswell Ave., Greenwood, S.C. 29646

[*] Notice: The portion of the term of this patent subsequent to Sep. 1, 2009 has been disclaimed.

[21] Appl. No.: 984,988

[22] Filed: Dec. 2, 1992

[51] Int. Cl.$^5$ .............................................. A01K 61/02
[52] U.S. Cl. ..................................... 422/261; 4/227.1;
4/227.2; 47/1.01; 47/59; 47/60; 47/61; 47/62;
47/63; 47/64; 47/48.5; 119/51.04; 422/265;
422/277; 422/264
[58] Field of Search ................... 422/264, 264 B, 265,
422/277, 261; 47/1.01, 59–64, 48.5; 210/169,
170, 198.1, 242.1; 222/23, 548; 4/227.1, 227.2,
227.5; 137/268; 119/3, 51.04

[56] References Cited

U.S. PATENT DOCUMENTS

| 2,711,714 | 6/1955 | Timeus . |
| 2,761,422 | 9/1956 | Martin . |
| 2,974,633 | 3/1961 | Whidden . |
| 2,984,208 | 5/1961 | Kopietz . |
| 3,512,505 | 5/1970 | Cross et al. . |
| 3,550,779 | 12/1970 | Cattano ................. 210/169 |
| 3,598,536 | 8/1971 | Christensen . |
| 3,643,632 | 2/1972 | Poirot . |
| 3,792,979 | 2/1974 | Clinton . |
| 3,845,902 | 11/1974 | Delamater . |
| 4,357,236 | 11/1982 | Krueger ................. 422/265 |
| 4,420,463 | 12/1983 | Pocius et al. .......... 422/277 |
| 4,630,634 | 12/1986 | Sasaki et al. . |
| 4,746,424 | 5/1988 | Drew .................... 210/169 |
| 4,798,707 | 1/1989 | Thomas et al. . |
| 4,822,579 | 4/1989 | Wagner ................. 422/263 |
| 5,064,624 | 11/1991 | King . |
| 5,143,020 | 9/1992 | Patrick . |

FOREIGN PATENT DOCUMENTS 143395 3/1902 Fed. Rep. of Germany .
728806 4/1980 U.S.S.R. .

Primary Examiner—Timothy M. McMahon
Attorney, Agent, or Firm—Dority & Manning

[57] ABSTRACT

An apparatus is provided for dispensing a fertilizer in a pond. The apparatus includes a flotation structure which is generally surrounded by a porous material, such as a net sack. An opening is provided in the flotation structure through which fertilizer is dumped to deposit the fertilizer in the net sack wherein it is dissolved by water flowing through the net sack at the bottom of the flotation structure.

14 Claims, 2 Drawing Sheets

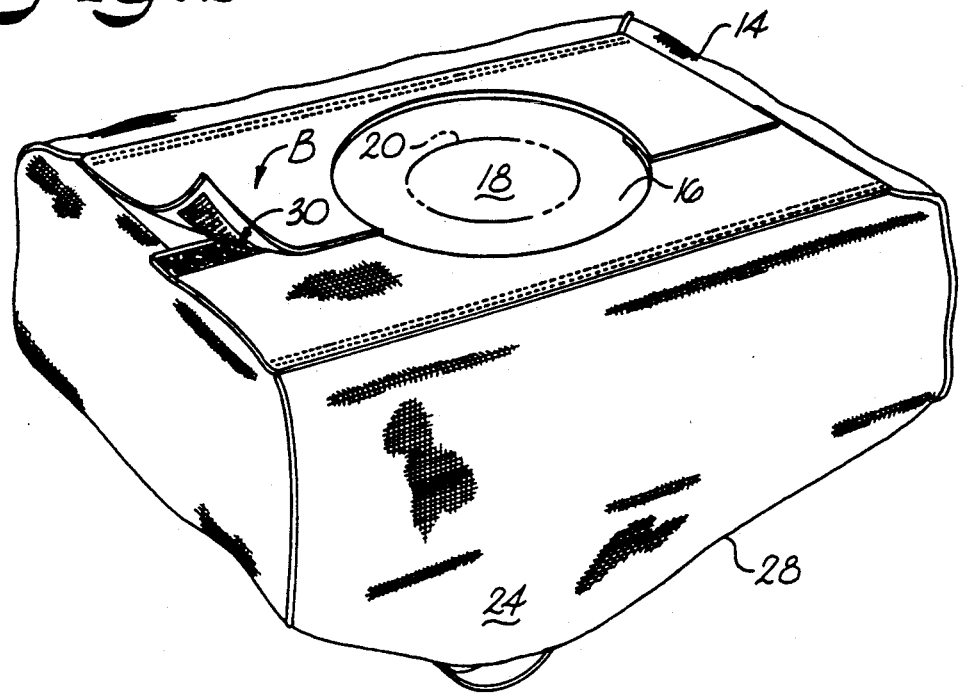
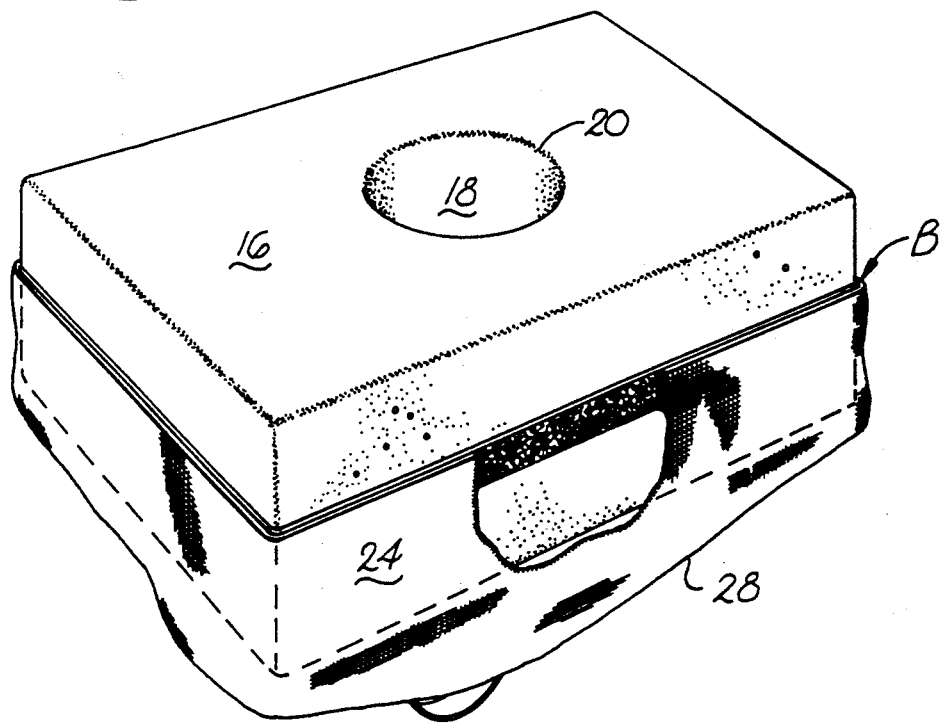

POND FERTILIZING APPARATUS

BACKGROUND OF THE INVENTION

This invention relates to an apparatus for fertilizing ponds, lagoons, and the like, and more particularly to an apparatus wherein fertilizer can be poured therein for dispersing the fertilizer in a body of water. One solution to the problem of properly fertilizing a body of water, such as a pond, is described in my U.S. Pat. No. 5,143,020 entitled "Pond Fertilizing Apparatus." In the device of the '020 patent, a funnel-shaped opening is provided in a flotation structure so that fertilizer can be poured through the funnel-shaped opening to fall into a receiver which is spaced below the bottom of the flotation structure. In that manner, water can flow between the top of the receiver and the flotation structure for dissolving fertilizer dumped into the receiver.

My present invention also addresses the problem of dispersing fertilizer throughout a pond without concentrating the fertilizer in any one spot which does occur when, for example, bags of fertilizer are dumped into the pond.

OBJECTS AND SUMMARY OF THE INVENTION

It is a principle object of the present invention to provide an apparatus wherein granular fertilizer can be first dissolved in water before being dispersed throughout a body of water such as a pond, lagoon, or the like.

Another important object of the present invention is to provide an apparatus wherein granular fertilizer is released in a dissolved form over a period of time in a body of water.

Still a further object of the present invention is to provide an apparatus for easily and efficiently dispersing granular fertilizer in a pond before the fertilizer can settle at the bottom of the pond.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, an apparatus of the present invention for dispersing fertilizer in a pond comprises a flotation structure which includes a buoyant block having an opening defined through the block. In one embodiment the opening may be funnel-shaped, having its smaller diameter opening at the top of the block and the larger diameter opening at the bottom of the block. A porous material, such as a net or mesh sack or screen, covers at least the bottom portion of the flotation structure. The porous material or sack is relatively loose fitting with respect to the buoyant block so that a space is defined between the bottom of the block and the porous material The space acts as a reservoir for fertilizer which is deposited through the opening. Means are also provided for anchoring the flotation structure within the pond, such as a cable and weight. The flotation structure is of sufficient size so as to float on the surface of a body of water while at least the bottom of the buoyant block and the porous material therearound are immersed below the surface of the water. In this manner, water can flow through the porous material to dissolve fertilizer held by the porous material within the space below the buoyant block.

BRIEF DESCRIPTION OF THE DRAWINGS

FIG. 2 is another perspective view of an embodiment of the apparatus according to the invention.

FIG. 3 is yet another perspective view of still another preferred embodiment of the invention.

DESCRIPTION OF THE PREFERRED EMBODIMENTS

Figure 1:
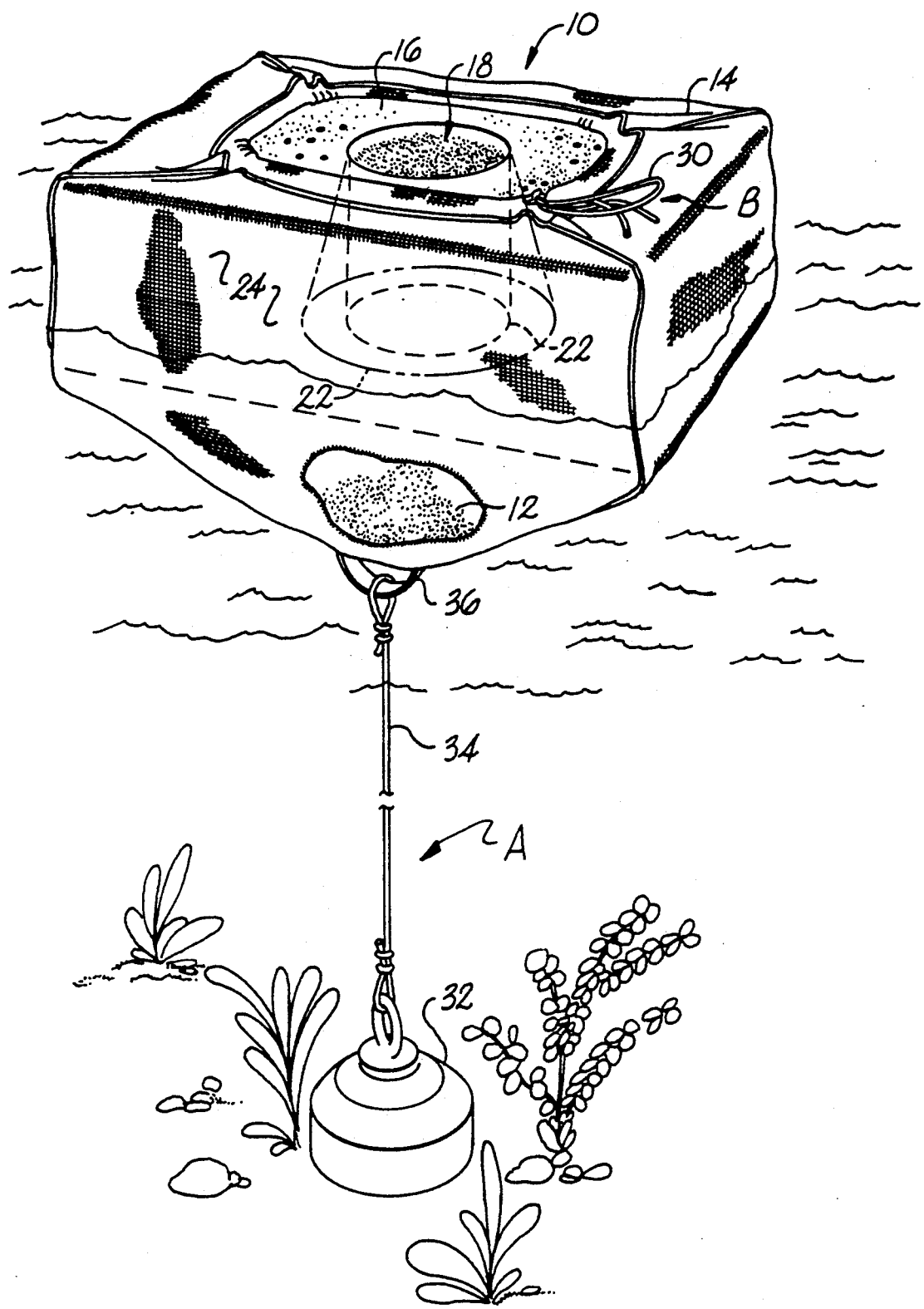
FIG. 1 is a perspective view illustrating an apparatus for dispensing fertilizer in a pond constructed in accordance with the present invention.

Reference will now be made in detail to the present preferred embodiments of the invention, examples of which are illustrated in the accompanying drawings.

Referring to FIG. 1 of the drawings, an apparatus 10 is provided for dispersing fertilizer throughout a pond or body of water. Apparatus 10 includes a flotation structure 14. Structure 14 is illustrated as generally rectangular but, this is for illustrative purposes only and structure 14 can be any general shape. Flotation structure 14 includes a buoyant block 16. Block 16 is preferably formed of styrofoam but, can also be of any other buoyant material such as wood, plastic, inner tube, or the like. Again, block 16 need not be rectangular as illustrated. Styrofoam is a preferred material for buoyant block 16 in that it is generally lightweight and easy to handle, shape, and manipulate.

Buoyant block 16 includes a top surface and a bottom surface. An opening 18 is defined through block 16, as illustrated particularly in FIG. 1 by the dashed lines. In one preferred embodiment, opening 18 may be funnel-shaped, also as indicated by the dashed lines in FIG. 1. In this embodiment, opening 18 has its smaller diameter end 20 defined in the top surface of block 16 and its larger diameter end 22 defined in the bottom surface of block 16. As illustrated in FIG. 1, fertilizer material 12 is dispersed or poured into opening 18 from the top of block 16. Funnel-shaped opening 18 is illustrated as being conical in the figures, but this is not a limitation. Funnel-shaped opening 18 may comprise essentially flat sides and be generally tapered in its shape from bottom to top of block 16.

A porous material 24 covers at least the bottom of flotation structure 14, as illustrated generally in the figures. Porous material 24 is preferably relatively flexible and formed of a net or mesh material or sack 28, 10 such as a laundry bag or sack. Porous material 24 may also be formed of any conventional screening or mesh material, such as a relatively fine fish net or commercially available screening material, which may be relatively inflexible. In a preferred embodiment, porous material 24 is formed of a nylon material. Porous material 24 may be formed in a sack 28 as depicted in FIG. 1, or material 24 may take the shape of relatively flat sides or folds which are folded around block 16 as shown in FIG. 2. For ease of construction, it is preferred that porous material 24 or sack 28 generally encompass or enclose block 16 as depicted in FIGS. 1 and 2. In these embodiments, sack 28 does not completely encompass or enclose block 16 so as to limit access to opening 18. As shown in FIGS. 1 and 2, access is provided to opening 18 so that fertilizer material may be disbursed through the opening without the necessity of removing or unfastening sack 28 from around opening 18.

It may also be preferred to form sack 28 of differing materials, depending on any variety of factors. For example, nylon mesh is a preferred type of porous material but, tends to break down in direct sunlight. In this instance, sack 28 may be comprised of nylon in the bottom portion and another material, which need not be porous, in the top portion.

In the embodiment shown in FIG. 3, sack 28 is attached or affixed to the sides of buoyant block 16. Thus, it should be understood, that porous material 24 need only enclose the bottom portion of block 16.

Porous material 24 or sack 28 is relatively loose fitting with respect to block 16 so that a space 26 is defined between the material 24 and the bottom of block 16, as depicted particularly in FIG. 1. In this manner, fertilizer 12 which is disbursed through opening 18 can fall through block 16 and be held by porous material 24 within space 26. Water is then free to flow through porous material 24 and dissolve the fertilizer carried within the porous material. It should be understood that if porous material 24 were relatively tight fitting against smaller diameter 22 of opening 18, water could not freely flow through material 24 so as to dissolve the fertilizer. With space 26, the fertilizer is exposed to free flowing water and, over a period of time, the water flowing through the space will dissolve the granular fertilizer which in turn fertilizes the water in the pond. Thus, a convenient and efficient means is provided for disbursing fertilizer in a fishing pond, industrial lagoon, or fish hatchery.

Apparatus 10 further includes means A for anchoring flotation structure 14 within the pond. Preferably, anchoring means A comprises a weight 32 attached through a cable 34 to a loop or hook 36 affixed or secured to sack 28. In another embodiment, weight 32 and cable 34 may be attached directly to block 16 and extend through sack 28. It should be understood that any convenient and conventional means of anchoring structure 14 may be utilized in the present invention.

Apparatus 10 also includes fastening means B for securing the porous material 24 or sack 28 relative to block 16. Fastening means B need not necessarily fasten sack 28 or material 24 directly to block 16, as illustrated in FIG. 1. In the embodiment of FIG. 1, fastening means B includes drawstring 30 for simply cinching or drawing the top of sack 28 down around block 16 while leaving access to opening 18. In the embodiment illustrated in FIG. 2, fastening means B includes, for example, a velcro strip 38 for fastening the edges or sides of sack 28 together around block 16. A zipper or snaps could also be used. In this embodiment, the velcro strip may be attached directly to block 16 or may be attached to adjacent edges of sack 28.

In the embodiment of FIG. 3, fastening means B are provided for fastening sack 28 around the edges or sides of block 16. Any suitable means may be provided for fastening sack 28 around block 16, for example, snaps, adhesives, zipper, drawstring, or the like. In this embodiment, sack 28 may preferably be secured directly to block 16 so as to provide for a more secure fit.

It will be apparent to those skilled in the art that various modifications and variations can be made in the apparatus and method of the present invention, without departing from the scope or spirit of the invention. For example, the porous material according to the invention may comprise a conventional net sack or any commercially available screening material. Thus, it is intended that the present invention cover the modifications and variations of this invention provided they come within the scope of the appended claims and their equivalents.

What is claimed is:

1. An apparatus for dispersing fertilizer in a pond, comprising:
   a flotation structure, said flotation structure including a buoyant block and an opening defined through said block;
   a flexible porous material secured relative to and enclosing the bottom of said flotation structure;
   a collapsible reservoir disposed below said flotation structure, said reservoir defined by said flexible porous material so that the entire surface area of said reservoir is freely permeable by water;
   means for anchoring said flotation structure within the pond; and
   said flotation structure being of sufficient buoyancy to float on the surface of a body of water while at least the bottom of said buoyant block and said reservoir are immersed below the surface of the water.

2. The apparatus as in claim 1, wherein said flexible porous material comprises a net sack, said flotation structure fitting within said sack.

3. The apparatus as in claim 2, wherein said net sack is secured relative said flotation structure by means of a drawstring disposed generally at the top of said flotation structure, said drawstring providing access to said opening.

4. The apparatus as in claim 1, wherein said porous material comprises a mesh sheet material.

5. The apparatus as in claim 4, wherein said mesh sheet material is secured to the sides of said buoyant block.

6. The apparatus as in claim 4, wherein said mesh sheet material generally surrounds said flotation structure and includes fastening means for securing said flotation structure within.

7. The apparatus as in claim 1, wherein said anchoring means comprises a weight attached with a cable to said flotation structure.

8. The apparatus as in claim 7, wherein said cable is attached directly to said porous material.

9. The apparatus as in claim 1, wherein said opening is generally funnel-shaped and has its smaller diameter end at the top of said block, and its larger diameter end at the bottom of said block.

10. An apparatus for dispersing fertilizer in a body of water, comprising:
    a buoyant block having sides and top and bottom surfaces, said block having an opening defined therethrough;
    a flexible porous net sack generally surrounding said buoyant block so as to encircle said bottom, sides, and top while providing access to said opening through said top of said buoyant block;
    a collapsible reservoir defined below substantially the entire said bottom surface of said buoyant block by said porous net sack; and
    said buoyant block being of sufficient size to float on the surface of the body of water with at least said bottom thereof being immersed in water, said opening providing means for dispersing fertilizer through said block, the fertilizer being held below said block within said reservoir by said porous net sack, said porous net sack being of a porosity so as to retain the fertilizer while allowing water to flow therethrough over the entire surface area of said reservoir to dissolve the fertilizer.

11. The apparatus as in claim 10, wherein said buoyant block is styrofoam.

12. The apparatus as in claim 10, wherein said porous net sack is secured around said block by a drawstring, said drawstring providing access to said opening in the top of said block.

13. The apparatus as in claim 10, further comprising means for anchoring said apparatus in position within the body of water.

14. The apparatus as in claim 13, wherein said anchoring means comprises a weight attached to said porous net sack.

* * * * *